US012304420B2

(12) United States Patent
Söhnchen et al.

(10) Patent No.: US 12,304,420 B2
(45) Date of Patent: May 20, 2025

(54) BELT RETRACTOR

(71) Applicant: Autoliv Development AB, Vargarda (SE)

(72) Inventors: Arndt Söhnchen, Hamburg (DE); Jens Ehlers, Horst (DE); Ronald Jabusch, Elmshorn (DE); Antto-Christian Glaesser, Hasloh (DE); Alexandru Cirstea, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 234 days.

(21) Appl. No.: 18/005,154

(22) PCT Filed: Jul. 12, 2021

(86) PCT No.: PCT/EP2021/069257
§ 371 (c)(1),
(2) Date: Jan. 11, 2023

(87) PCT Pub. No.: WO2022/013118
PCT Pub. Date: Jan. 20, 2022

(65) Prior Publication Data
US 2023/0256933 A1   Aug. 17, 2023

(30) Foreign Application Priority Data
Jul. 16, 2020 (DE) ..................... 10 2020 208 905.1

(51) Int. Cl.
*B60R 22/34* (2006.01)
(52) U.S. Cl.
CPC .................... *B60R 22/34* (2013.01)

(58) Field of Classification Search
CPC ... B60R 22/34; B60R 22/46; B60R 2022/444; B60R 2022/4666
See application file for complete search history.

(56) References Cited

U.S. PATENT DOCUMENTS

| 8,931,723 | B2 * | 1/2015 | Tatsuma | ................. B60R 22/34 242/375 |
| 2004/0065762 | A1 * | 4/2004 | Mori | ....................... B60R 22/46 192/55.1 |

(Continued)

FOREIGN PATENT DOCUMENTS

| DE | 10101045 A1 | 7/2002 |
| DE | 10101048 A1 | 7/2002 |

(Continued)

*Primary Examiner* — Sang K Kim
(74) *Attorney, Agent, or Firm* — DICKINSON WRIGHT PLLC

(57) ABSTRACT

The present invention relates to a belt retractor comprising a belt shaft which is rotatably mounted in a housing and onto which a safety belt can be wound, the housing being able to be fastened to the vehicle, and an electric motor for driving the belt shaft to move rotationally, and a gear mechanism transmitting the rotational movement from the electric motor to the belt shaft, wherein the gear mechanism can be driven as an assembly in a first force-transmission path to drive the belt shaft with a first torque, and the gear mechanism can be driven to drive the belt shaft with a second torque, by shifting a speed-controlled and/or torque-controlled coupling, whereby a second force-transmission path is opened, wherein the coupling has at least one coupling element which is spring-loaded by a spring into engagement in a first part of the gear mechanism.

9 Claims, 3 Drawing Sheets

(56) References Cited

U.S. PATENT DOCUMENTS

Figure 1:
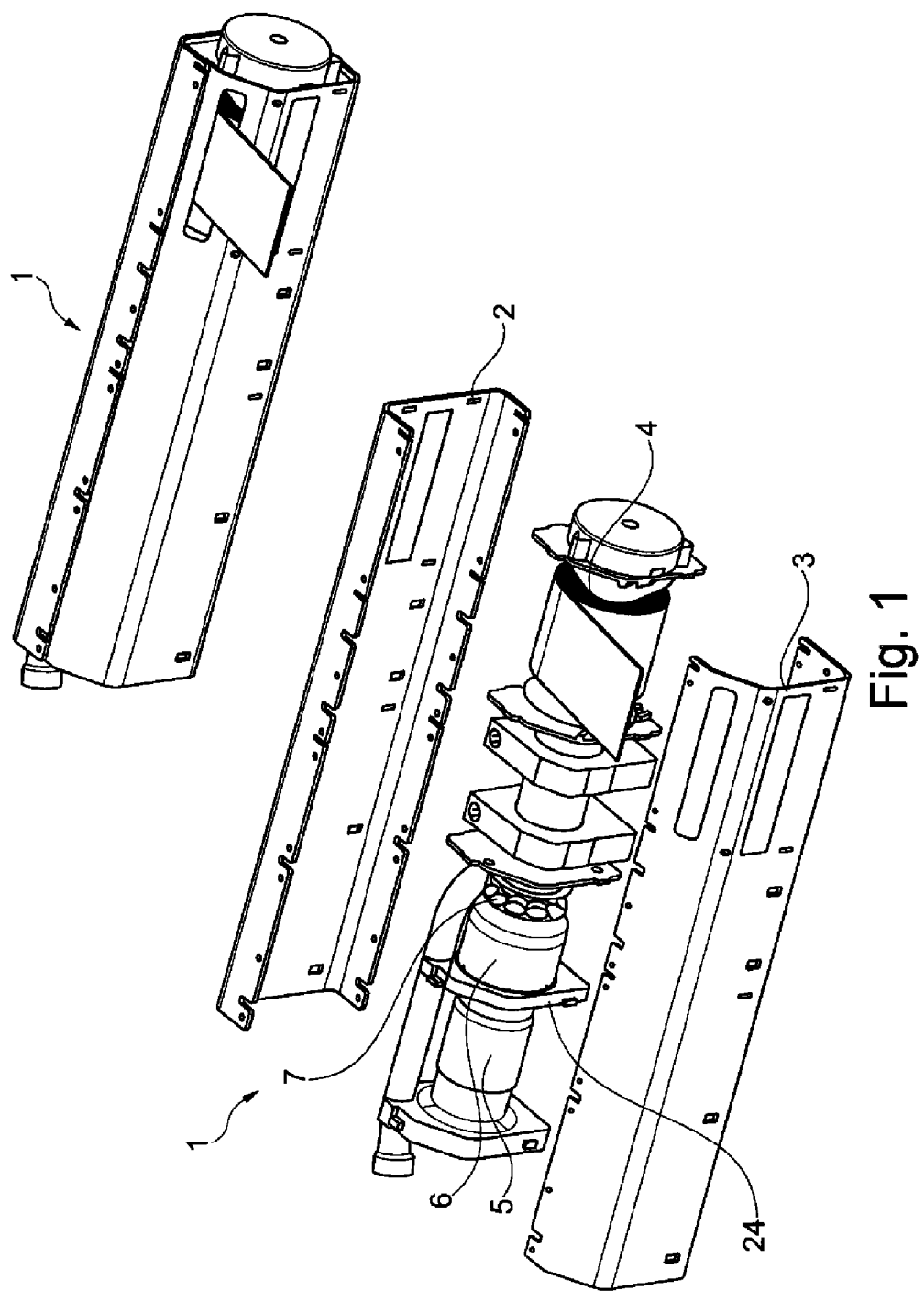

2005/0082411 A1* 4/2005 Prokscha ................ B60R 22/46
                                                         242/390.8
2008/0191083 A1    8/2008 Sumiyashiki
2013/0256445 A1   10/2013 Lucht et al.

FOREIGN PATENT DOCUMENTS

DE    102015221572 A1   5/2017
DE    102018219040 A1   5/2020
WO       200071394 A1  11/2000

* cited by examiner

BELT RETRACTOR

CROSS-REFERENCE TO RELATED APPLICATIONS

This application is a 35 U.S.C. § 371 national phase of PCT International Application No. PCT/EP2021/069257, filed Jul. 12, 2021, which claims the benefit of priority under 35 U.S.C. § 119 to German Patent Application No. 10 2020 208 905.1, filed Jul. 16, 2020, the contents of which are incorporated herein by reference in its entirety.

FIELD

The present invention relates to a belt retractor.

Belt retractors have as basic components a load-bearing frame and a belt reel that is rotatably mounted in the frame and onto which a safety belt can be wound. The frame serves not only for mounting the belt reel but also for fastening to a seat structure or to a vehicle structure and for this purpose is made of a correspondingly thick steel sheet, which is bent into a U-shaped frame.

Furthermore, in modern safety belt devices, belt retractors are provided with electric motors, which drive the belt shaft upon activation to a reversible belt tightening in the winding direction, for example. The electric motor is likewise fastened to the frame and is arranged laterally of the belt shaft with a drive shaft oriented in parallel to the axis of rotation of the belt shaft. Furthermore, it is known to provide a gear mechanism between the belt shaft and the electric motor, by means of which gear mechanism the rotational speed of the electric motor is translated into a predetermined rotational speed of the belt shaft. The use of the gear mechanism also makes it possible to use an electric motor that is as compact as possible with a high rotational speed. A belt retractor with an increased installation space requirement is thus produced overall, despite the use of the compact electric motor made possible by the gear mechanism. Such a belt retractor is known, for example, from publication WO 03/0 99 619 A2.

If the belt shaft is to be driven at different rotational speeds and torques, further gear stages must be provided, which further increase the installation space requirement. Such a belt retractor is known, for example, from publication DE 199 27 731 C2.

Since the installation spaces available on the seat structure of the vehicle seats or in general in very small vehicles are very limited in their size and cannot be enlarged as desired for design reasons, the arrangement of such a belt retractor on the vehicle seat or even in a small vehicle is fundamentally problematic.

DE 10 2018 219 040 A1 discloses a belt retractor in which the installation space requirement is further reduced in that the gear mechanism is driven as an assembly in a first force-transmission path and in that a coupling is provided which activates the gear mechanism by a shifting operation and opens up a second force-transmission path. As a result, a gear mechanism with a single force-transmission path can be used to implement two different transmission ratios. In this case, the gear mechanism itself is driven as an assembly, i.e., as a block, in the first force-transmission path, without the gear mechanism parts in themselves moving relative to one another. Here, the coupling has a drive wheel which is driven by the electric motor and has three triangular openings which narrow radially outwardly and in each of which a coupling pawl engages with a respective control pin. The coupling pawls are guided in a longitudinally displaceable manner in the radial direction and are each spring-loaded radially outwardly via a spring. In order to shift the coupling, the coupling pawls are pulled radially inwardly against the spring force by when a particular rotational acceleration of the drive wheel is exceeded, whereby the rotational connection between the coupling pawls and a first part assigned to the gear mechanism is released.

Against this background, the object of the invention is to provide an improved belt retractor with an electric motor and a gear mechanism with a coupling having a simplified structure.

In order to achieve the object, a belt retractor with the features of Claim 1 is proposed. Further preferred developments of the invention can be taken from the dependent claims, the figures and the associated description.

According to the basic idea of the invention, it is proposed according to Claim 1 that a drive wheel which is connected to the electric motor in a rotationally fixed manner is provided with a polygonal force-transmission profile, and the coupling element has at least one force-transmission portion, which abuts on the polygonal force-transmission profile and by which the coupling element can be moved, against the force of the spring, out of engagement in the first part of the gear mechanism due to a relative movement of the drive wheel when a predetermined rotational speed transmitted by the drive wheel and/or a predetermined torque is exceeded.

The advantage of this solution is that the drive wheel directly triggers the coupling movement of the coupling element by providing via the polygonal profile a corresponding force-transmission surface, which the coupling element abuts. The coupling element itself is spring-loaded in the direction of the engagement in the first part, wherein the spring force of the spring is designed such that only after a predetermined rotational speed and/or a predetermined torque and/or a predetermined rotational acceleration has been exceeded will the drive wheel move the coupling element out of the engagement position, thereby releasing the rotational connection created via the coupling element. By releasing the rotational connection, a first force-transmission path created by the rotational connection can, for example, be interrupted and a second force-transmission path can be opened. In this second force-transmission path, a gear mechanism can, for example, be interposed, which, as a result of its activation, converts the rotational speed of the electric motor into a lower rotational speed transmitted to the belt shaft, for example at a gear ratio of 1:80.

It is furthermore proposed that the coupling element transmits to the first part of the gear mechanism the rotational movement of the drive wheel below the predetermined rotational speed and/or below the predetermined torque. As a result, the rotational movement of the electric motor in the case of low torques, rotational speeds and/or rotational accelerations can be transmitted in a first force-transmission path directly via the coupling element to the first part of the gear mechanism, for example at a gear ratio of 1:1, to the belt shaft, as a result of which, for example, a winding aid of the safety belt into the parking position, a comfort function for adjusting the retraction force acting on the belt shaft or the like are implemented.

In this case, the coupling element can preferably have an engagement portion engaging in the first part of the gear mechanism, and the coupling element can have at least two force-transmission portions which are symmetrical in relation to an axis of symmetry extending through the engagement portion and which the coupling element abuts on the polygonal force-transmission profile of the drive wheel. The coupling element transmits the rotational movement to the first part via the engagement portion. The force transmission from the drive wheel to the coupling element takes place due to the symmetrical force-transmission portions in both rotational directions having force ratios that are as identical as possible, and the coupling element can be mounted in two different orientations.

It is furthermore proposed that the cross-section of the polygonal force-transmission profile has a triangular profile, and the coupling element encompasses the triangular profile at two corners. The coupling element encompasses the force-transmission profile at two corners with a form-fitting overlap and, as a result, transmits the rotational drive movement in both rotational directions. Furthermore, as a result, when one of the predetermined conditions is exceeded, the coupling element is entrained in a form-fitting manner and pulled out of the engagement position.

In the process, the symmetrical force transmission having force ratios that are as identical as possible can be implemented in both rotational directions preferably by the triangular profile having the geometry of an equilateral triangle. Furthermore, assembly can thereby be facilitated since the assembly of the belt retractor is possible with three different positions of the drive wheel as a result. Since the tips of the triangular profile have an identical geometry as a result, it is in particular irrelevant which of the tips the coupling element abuts with the force-transmission portion(s).

It is furthermore proposed that the coupling element is mounted on a second part of the gear mechanism, and the second part has a gear wheel which is connected in a rotationally fixed manner and with which it is in a toothed engagement with one or more gear wheels of a transmission gear mechanism. The second part of the gear mechanism, on which the coupling element is mounted, thus simultaneously forms, via the gear wheel connected thereto in a rotationally fixed manner, the drive via which the rotational movement is introduced into the transmission gear mechanism.

It is furthermore proposed that in this case, the second part has a stop surface which the drive wheel with the force-transmission profile comes to abut in a force-transmitting manner by the execution of a relative movement. The relative movement is triggered when the predetermined rotational speed, the predetermined torque and/or the predetermined rotational acceleration is exceeded. As a result, the coupling element is moved out of the engagement position, and the drive wheel comes to abut the second part in a force-transmitting manner. As a result, the drive wheel drives the second part and, via the gear wheel connected thereto in a rotationally fixed manner, also drives the transmission gear mechanism in the case of a simultaneously released rotational connection between the drive wheel and the first part.

It is furthermore proposed that the spring is formed by a bow spring which is connected with a first end to the coupling element and with a second end to the second part. The advantages of using a bow spring are that it is cost-effective, that it can be easily assembled and, in addition, can be connected very simply to the coupling element and the second part in a force-transmitting manner, for example by openings or stop surfaces.

In this case, the second part can preferably have a guide in which the coupling element is guided with the engagement portion. The movement of the coupling element is triggered by the spring force and the movement of the drive wheel, while the direction of the movement is defined by the guide of the coupling element on the second part. In this case, the guide of the coupling element in the region of the engagement portion is particularly advantageous since the coupling element is thereby preferably guided as close as possible to the connection to be implemented with the first part and finds support there.

Figure 2:
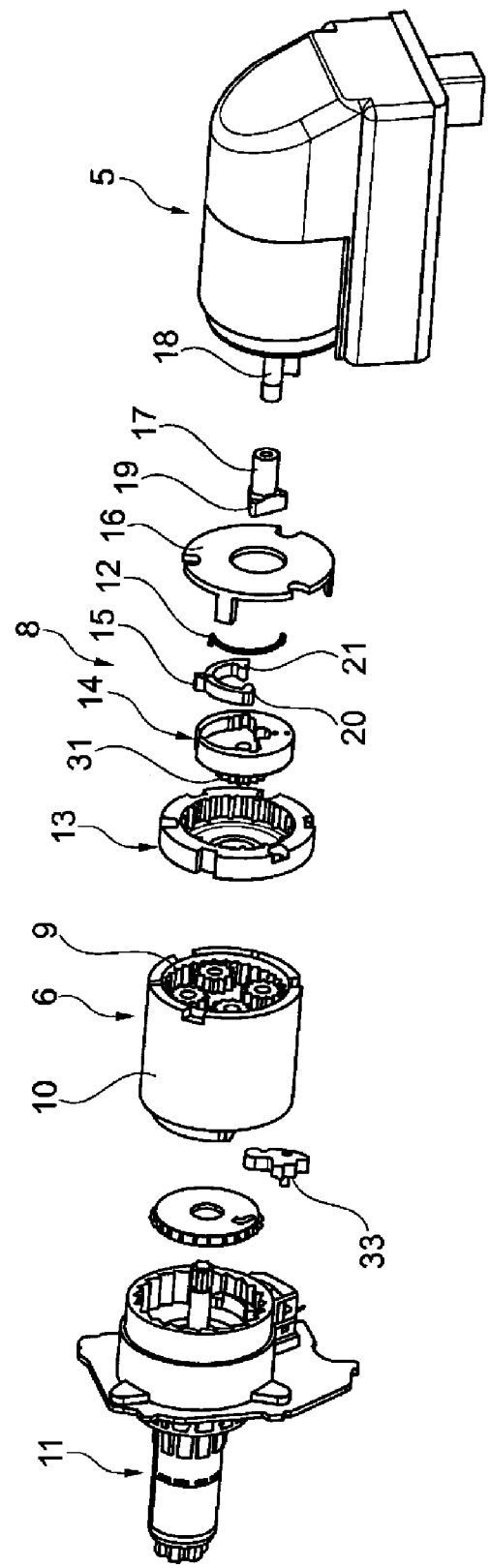
Figure 3:
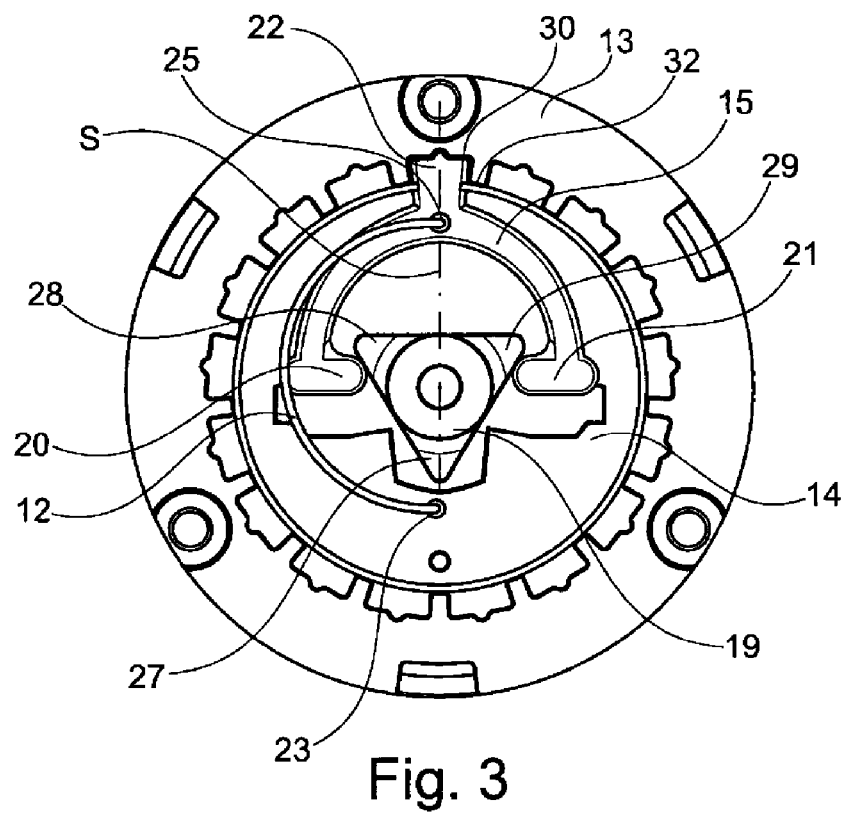
Figure 4:
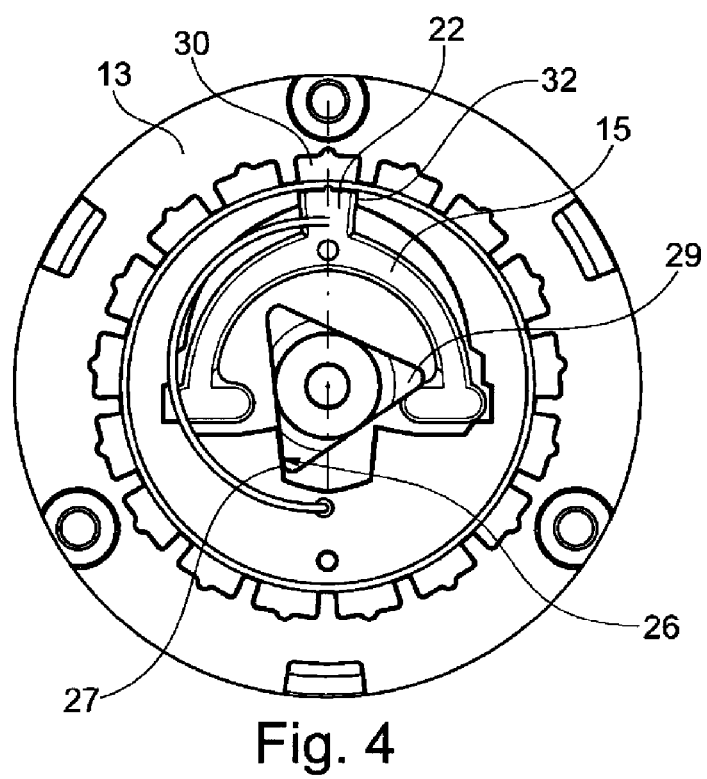

The invention is explained below using preferred embodiments with reference to the accompanying figures. The following are shown:

FIG. 1 is a belt retractor according to the invention with two housing shells in the assembled and disassembled states, FIG. 2 is a gear mechanism, an electric motor and a coupling, arranged therebetween, of the belt retractor in an exploded illustration, FIG. 3 is a sectional illustration with the coupling in a first position, and FIG. 4 is a sectional illustration with the coupling in a second position.

FIG. 1 shows a belt retractor 1 according to the invention with a housing which is composed of two housing shells 2 and 3 and serves both to fasten the belt retractor 1 to a vehicle, preferably in a narrow elongate installation space of a vehicle seat, and to mount and fasten the individual parts of the belt retractor 1 that are described in more detail below. The housing can also be part of a higher-level structure of the vehicle seat or of the vehicle, such as a strut or a bar.

The housing is provided on the inside with a plurality of webs 24 for mounting the belt retractor 1, which webs are oriented perpendicularly to the axis of rotation of the belt retractor and are connected to the housing in a form-fitting and rotationally fixed manner in relation to the axis of rotation. The belt retractor 1 has, as a basic component, a belt shaft 4 onto which a safety belt provided for restraining an occupant can be wound. Furthermore, an irreversible belt tensioner 7 is provided for driving the belt shaft 4 in the winding direction and thus for eliminating any existing belt slack in an early phase of an accident. In addition, an electric motor 5 and a gear mechanism 6 are provided. The belt shaft 4, the irreversible belt tensioner 7, the electric motor 5 and the gear mechanism 6 are arranged coaxially with one another. Furthermore, the electric motor 5, the gear mechanism 6 and the irreversible belt tensioner 7 are dimensioned in the external dimensions perpendicular to the axis of rotation of the belt shaft such that they are smaller than the maximum diameter of the fully wound-on wound belt on the belt shaft 4. Since the cross-section of the housing is of angular design here, additional free spaces, which can be used, for example, for the arrangement of a tensioning drive tube of the irreversible belt tensioner 7 or other attachment parts, such as control units or also electrical lines, remain in the corners. The maximum outer dimensions are thus predefined by the maximum diameter of the wound belt. Since the maximum diameter is in turn predefined by the thickness of the belt strap and the maximum length of the belt strap to be wound up and cannot be reduced without changing the belt strap, the belt retractor 1 thus has the smallest possible dimensions perpendicular to the axis of rotation of the belt shaft 4 and can thus also be arranged and fastened in very narrow and elongate free spaces of the vehicle seat and of the vehicle structure.

FIG. 2 shows the electric motor 5 with the gear mechanism 6, a coupling 8 arranged therebetween and an additionally provided optional force-limiting unit 11.

The gear mechanism 6 comprises, as basic components, the coupling 8, a transmission gear mechanism 9, which is designed here as a planetary gear, and a gear mechanism housing 10. The gear mechanism 6 is encompassed on the outside by the gear mechanism housing 10 and has a cylindrical basic shape. The gear mechanism housing 10 itself is tubular or annular and has, on its inner side, an internal toothing in which the planet wheels of the planetary gear roll.

The electric motor 5 has a drive shaft 18 which is guided to the outside and on which a drive wheel 17 is fixed in a rotationally fixed manner via a toothed engagement. When activated, the electric motor 8 thus directly drives the drive wheel 17.

In its basic structure, the coupling 8 comprises a first part 13, a second part 14, a coupling element 15 and a spring 12. The first part 13 is formed in the shape of a ring with a regular tooth profile 30 arranged radially on the inside. Furthermore, the first part 13 has a plurality of recesses which are radially on the outside and are aligned with recesses in the gear mechanism housing 10. The first part 13 is covered at the end face by a cover disk 16, which additionally has axially projecting fingers, with which it engages in the radially outer recesses of the first part 13 and of the gear mechanism housing 10, thereby fixing the first part 13 in a rotationally fixed manner relative to the gear mechanism housing 10 in the circumferential direction. If the connection is implemented via a press fit, an axial securing of the first part 13 relative to the gear mechanism housing 10 can thereby additionally be implemented. Radially on the inside, the first part 13 has a circular free space, in which the second part 14 of the coupling 8 is rotatably arranged, as can also be seen in FIGS. 3 and 4. The second part 14 is thus also axially fixed after the cover disk 16 has been attached. The cover disk 16 furthermore has a central opening through which the drive wheel 17 extends. At its free end, the drive wheel 17 has a polygonal force-transmission profile 19, with which it engages in a free space provided in the second part 14 radially on the inside.

Furthermore, the coupling element 15 is arranged in the free space of the second part 14 such that it encompasses the force-transmission profile 19 radially on the outside.

The polygonal force-transmission profile 19 of the drive wheel 17 has the geometry of an equilateral triangle with three corners 27, 28 and 29 with identical angles and, as a result, lateral force-transmission surfaces identically oriented to one another. The coupling element 15 has a radially projecting engagement portion 22 with which it is guided radially displaceably in a guide 32 of the second part 14. Furthermore, the coupling element 15 has two arcuate arms which are symmetrical to an axis of symmetry S extending through the center of the engagement portion 22 and approximately complement one another to form a semicircle. At the ends of the arms, the coupling element 15 is formed in each case with force-transmission portions 20, 21 which are directed radially inward and with which it encompasses a corner 28, 29 of the force-transmission profile 19 of the drive shaft 17, as can be seen in FIG. 3. The spring 12 is designed in the form of a bow spring and is attached with a first end 25 to the coupling element 15 in an opening arranged radially inward from the engagement portion 22 on the axis of symmetry S. Furthermore, the spring 12 is attached with a second end 23 in an opening of the second part 14, which opening is arranged such that it is likewise on the axis of symmetry S in the unloaded arrangement of the coupling element 15, i.e., when the electric motor 5 is at a standstill. In its spring characteristic and in the arrangement of the two fixed ends 25 and 23, the spring 12 is designed such that it pushes the coupling element 15 with the engagement portion 22 radially outwards into engagement in the tooth profile 30 of the first part 13. As a result, a rotational connection between the first part 13 and the second part 14 is created by the coupling element 15 in the unloaded state.

In the event that the electric motor 5 in the initial position of the coupling element 15 shown in FIG. 3 is operated with low torques, rotational speeds and/or rotational accelerations, as is the case, for example, for winding the safety belt into the parking position or for adjusting the retraction force exerted on the belt shaft 4 (comfort function), the drive wheel 17 drives the first part 13 via the force-transmission profile 19 and the coupling element 15. Since the first part 13 is connected to the gear mechanism housing 10 in a rotationally fixed manner via the cover disk 16, the entire gear mechanism 6 is driven as an assembly and, thereby, the belt shaft 4 is driven at a gear ratio of 1:1. In this case, the belt shaft 4 can be driven via the two force-transmission portions 20, 21 in both rotational directions, wherein the force transmission takes place only via one of the force-transmission portions 20 or 21 depending on the rotational direction. Since both the coupling element 15 and the force-transmission profile 19 are oriented symmetrically to the axis of symmetry S in the position of FIG. 3, identical force conditions result in both rotational directions. On its axial end face facing the planetary gear, the second part 14 has a centrally arranged gear wheel 31 which engages in the teeth of the planet wheels of the planetary gear. Since the second part 14 rotates at an identical rotational speed to the first part 13, the entire gear mechanism 6 is also entrained via the central gear wheel 31. The entire gear mechanism 6, together with the first part 13 and the second part 14, rotates as an assembly at the rotational speed driven by the drive shaft 17, without the gear wheels of the gear mechanism 6 additionally executing further relative rotational movements relative to one another.

The opening of the coupling 8 takes place by the power of the electric motor 5 being increased, for example for a reversible belt tensioning, to such an extent that a predetermined rotational speed, a predetermined torque and/or a predetermined rotational acceleration is exceeded. In this case, the drive wheel 17 rotates so quickly that the coupling element 15 lags behind and is pulled against the spring force of the spring 12 into the position shown in FIG. 4. The coupling element 15 with the engagement portion 22 here disengages from the tooth profile 30 and the rotational connection between the first part 13 and the second part 14 is released. The coupling 8 is thus opened. At the same time, the drive shaft 17 comes to abut a side face of the force-transmission profile 19 on a stop surface 26 of the second part 14 and, as a result, subsequently drives the second part 14 directly to move rotationally, while the first part 13 is no longer being driven due to the open coupling 8.

In this case, the rotational movement of the second part 14 is transmitted via the central gear wheel 31 to the gear wheels of the planetary gear. The gear mechanism housing 10 is no longer being driven and can additionally be locked on the vehicle via a locking device 33; in any case, the gear wheels of the planetary gear rotate relative to the gear mechanism housing 10 and the rotational movement of the drive shaft 17 is now converted into a slower rotational speed on the belt shaft 4 at a gear ratio of 1:80. Due to the conversion of the higher rotational speed into the smaller rotational speed, the torque exerted on the belt shaft 4 and the retraction force exerted thereby on the safety belt are increased at the same time.

As a result, the electric motor 5 can be operated in a first force-transmission path with a closed coupling 8 and deactivated gear mechanism 6 at a gear ratio of 1:1 and a rotational speed of 60 to 180 rpm in order to wind up the belt strap into the parking position after unbuckling, by rotating the gear mechanism 6 as a block. If the proposed rotational speed is also to be the rotational speed of the belt shaft 4, the rotational drive movement can then also be further transmitted to the belt shaft 4 at a gear ratio of 1:1. For reversible belt tensioning, the rotational speed of the electric motor 5 can be increased abruptly to 5000 to 15000 rpm, which is converted by the gear mechanism 6 in the second force-transmission path opened by the open coupling 8, to the lower rotational speed of approximately 140 to 420 rpm of the output gear wheel 23 at the gear ratio of 1:80. In order to shift the coupling 8, the significantly higher rotational drive speed of 5000 to 15000 rpm is used in comparison to the rotational drive speed of 60 to 180 rpm when driving the belt shaft 4 in the first force-transmission path. The coupling 8, or the gear mechanism 6 with the integrated coupling 8, can thus be designed such that it opens, for example, only when a rotational drive speed of 1000 rpm is exceeded. The transmission of the rotational drive movement of 60 to 180 rpm in the first force-transmission path thus takes place dependably, and unintentional opening of the coupling 8 during the winding operation of the safety belt into the parking position can be prevented. Furthermore, as an alternative to the speed-controlled opening, the coupling 8 can also open when the torque to be overcome suddenly rises at the same or decreasing rotational speed. Such a situation can occur, for example, when the safety belt is rolled up at high speed into the parking position.

When the safety belt is then almost fully wound up, the torque to be overcome will rise, and the coupling 8 shifts automatically. By shifting the coupling 8, the rotational speed of the output gear wheel 23 is reduced and the torque exerted by the output gear wheel 23 is increased so that the safety belt is subsequently wound up at a lower retraction speed and with an increased retraction force.

As a result of the planetary gear, the gear mechanism 6 has a single force-transmission path, here a two-stage planetary gear. By means of the proposed solution of the transmission of the rotational drive movement via the gear mechanism 6 rotating as an assembly, a first force-transmission path for implementing a first function, here the winding of the safety belt into the parking position, is created without an additional installation space requirement. In addition, the shifting of the coupling 8 takes place in a very simple manner by increasing the rotational speed so that the second force-transmission path is opened automatically when the rotational speed of the electric motor 5 is increased for tensioning the safety belt, i.e., for its second function. The shifting of the coupling 8 is thus controlled directly by the functional change of the electric motor 5 itself.

Furthermore, the electric motor 5 and the gear mechanism 6 are cylindrical and oriented coaxially with one another and coaxially with the axis of rotation of the belt shaft 4. In addition, in the cross-section relative to their axis of rotation, both the electric motor 5 and the gear mechanism 6 have a diameter that is less than the outer diameter of the wound belt when the belt strap is maximally wound up. This results in a very slim, elongate structure of the belt retractor, the maximum outer dimensions of which are predefined by the maximum outer diameter of the wound belt. Since the maximum outer diameter of the wound belt is absolutely predefined due to the thickness and the length of the belt strap to be wound up and cannot be reduced, the belt retractor can thus be formed with the smallest possible dimensions perpendicular to the axis of rotation of the belt shaft 4.

The coupling 8 is understood here to be an assembly of the gear mechanism 6 so that the first part 13 and the second part 14 are naturally parts of the coupling 8 but thus also parts of the higher-level assembly of the gear mechanism 6. For this purpose, the coupling 8 is preferably arranged on the input side, facing the electric motor 5, of the gear mechanism 6.

The electric motor 5 is preferably voltage-controlled and, as a result of the application of different voltages, causes different torques acting on the belt shaft 4 or different retraction forces exerted on the safety belt. In the normal wearing state of the safety belt, a voltage of 2 to 3 V is applied, by which the retraction force is reduced to the lowest possible level, which is however nevertheless sufficient to pull the safety belt in a functionally reliable manner toward the occupant after the occupant has moved. In order to wind the safety belt into the parking position after unbuckling, the voltage is increased to 9 V so that the safety belt is wound into the parking position with an increased retraction force. Furthermore, during a reversible tensioning operation, the voltage is also increased to 12 V, which can be increased to approximately 36 V for a possibly additionally provided function of reversible belt tensioning with an increased retraction force.

The invention claimed is:

1. A belt retractor comprising
a belt shaft which is rotatably mounted in a housing and onto which a safety belt can be wound, the housing being able to be fastened to the vehicle, and
an electric motor for driving the belt shaft to move rotationally, and
a gear mechanism transmitting the rotational movement from the electric motor to the belt shaft, wherein
the gear mechanism can be driven as an assembly in a first force-transmission path to drive the belt shaft with a first torque, and
the gear mechanism can be driven to drive the belt shaft with a second torque, by shifting a speed-controlled and/or torque-controlled coupling, whereby a second force-transmission path is opened, wherein
the coupling has at least one coupling element which is spring-loaded by a spring into engagement in a first part of the gear mechanism, comprising
a drive wheel which is connected to the electric motor in a rotationally fixed manner is provided with a polygonal force-transmission profile, wherein
the coupling element has at least one force-transmission portion which abuts the polygonal force-transmission profile and by which the coupling element can be moved, against the force of the spring, out of engagement in the first part of the gear mechanism due to a relative movement of the drive wheel relative to the coupling element when a predetermined rotational speed transmitted by the drive wheel and/or a predetermined torque and/or a predetermined rotational acceleration is exceeded.

2. The belt retractor according to claim 1, wherein
the coupling element transmits the rotational movement of the drive wheel below the predetermined rotational speed and/or below the predetermined torque to the first part of the gear mechanism.

3. The belt retractor according to claim 1, wherein
the coupling element has an engagement portion engaging in the first part of the gear mechanism, and
the coupling element has at least two force-transmission portions which are symmetrical to an axis of symmetry extending through the engagement portion and with which the coupling element abuts the polygonal force-transmission profile of the drive wheel.

4. The belt retractor according to claim 1, wherein
the cross-section of the polygonal force-transmission profile has a triangular profile, and
the coupling element encompasses the triangular profile at two corners.

5. The belt retractor according to claim 4, wherein
the triangular profile has the geometry of an equilateral triangle.

6. The belt retractor according to claim 1, wherein
the coupling element is mounted on a second part of the gear mechanism, and
the second part has a rotatably connected gear wheel, with which it is in a toothed engagement with one or more gear wheels of a transmission gear mechanism.

7. The belt retractor according to claim 6, wherein
the second part has a stop surface which the drive wheel with the force-transmission profile comes to abut in a force-transmitting manner by the execution of the relative movement.

8. The belt retractor according to claim 6, wherein
the spring is formed by a bow spring which is connected with a first end to the coupling element and with a second end to the second part.

9. The belt retractor according to claim 6, wherein
the second part has a guide in which the coupling element is guided with the engagement portion.

* * * * *